Inventors:
Harold F. Silver;
Frank B Price,
By Hume, Groen Clement-Hauer
attys.

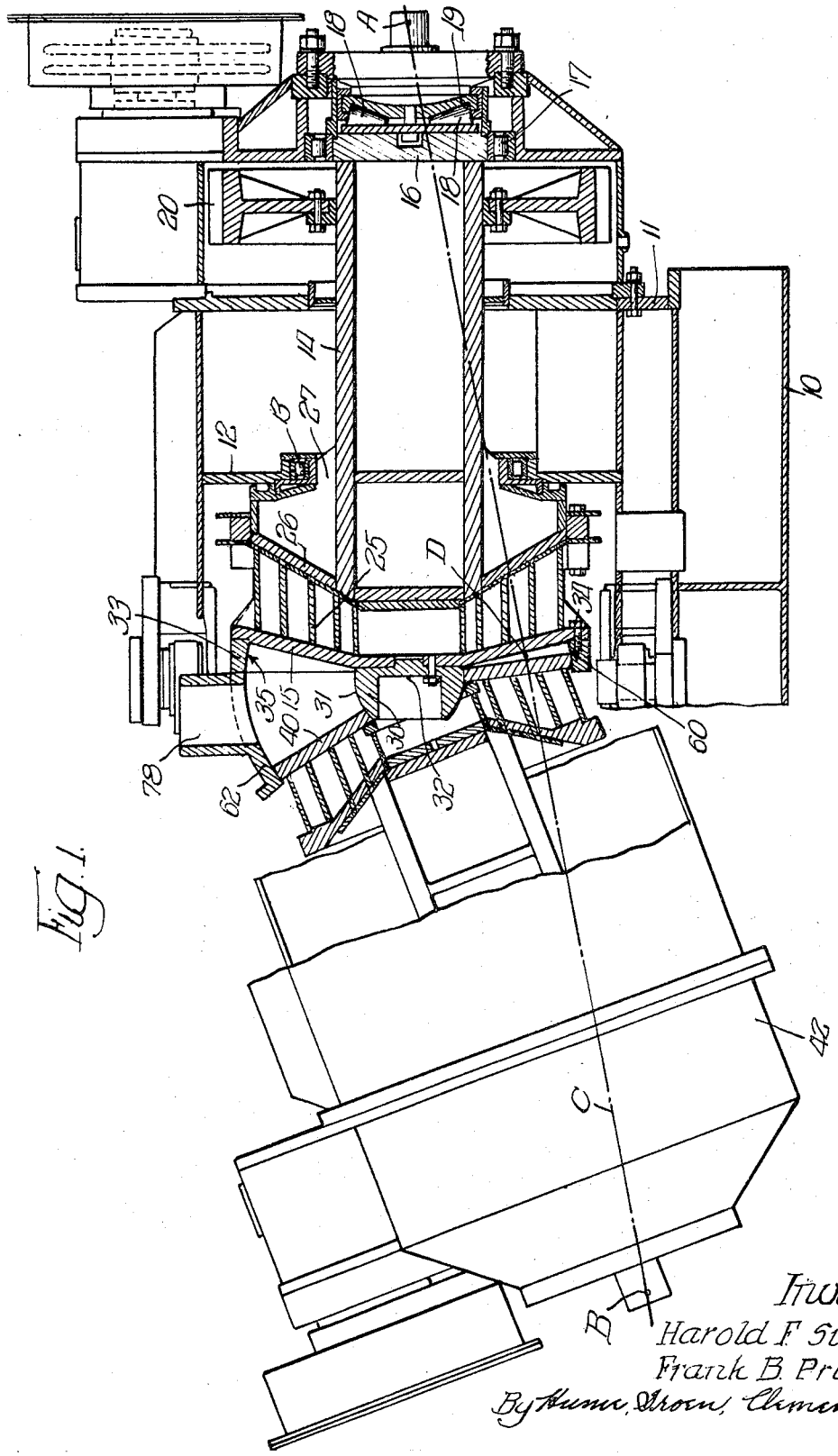

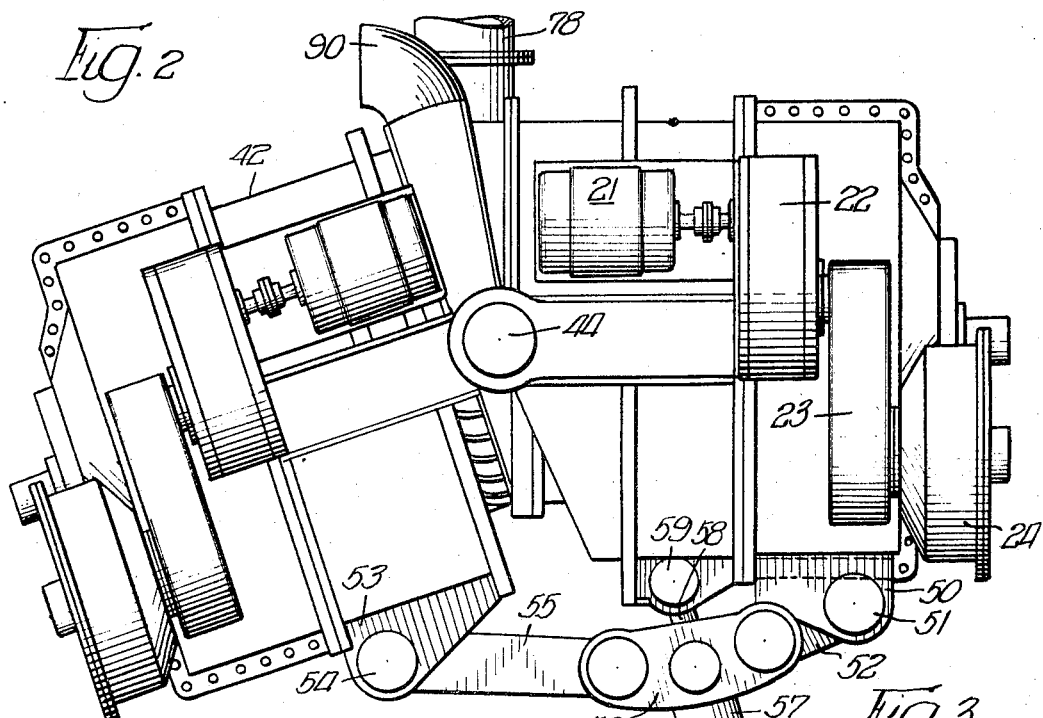
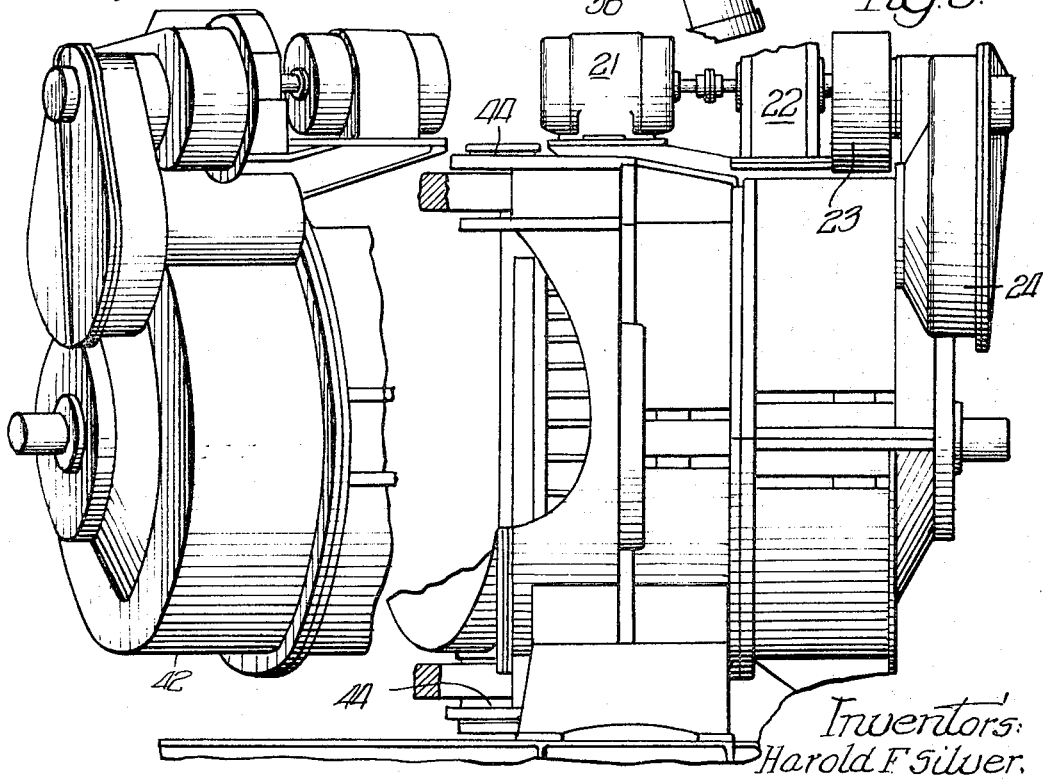

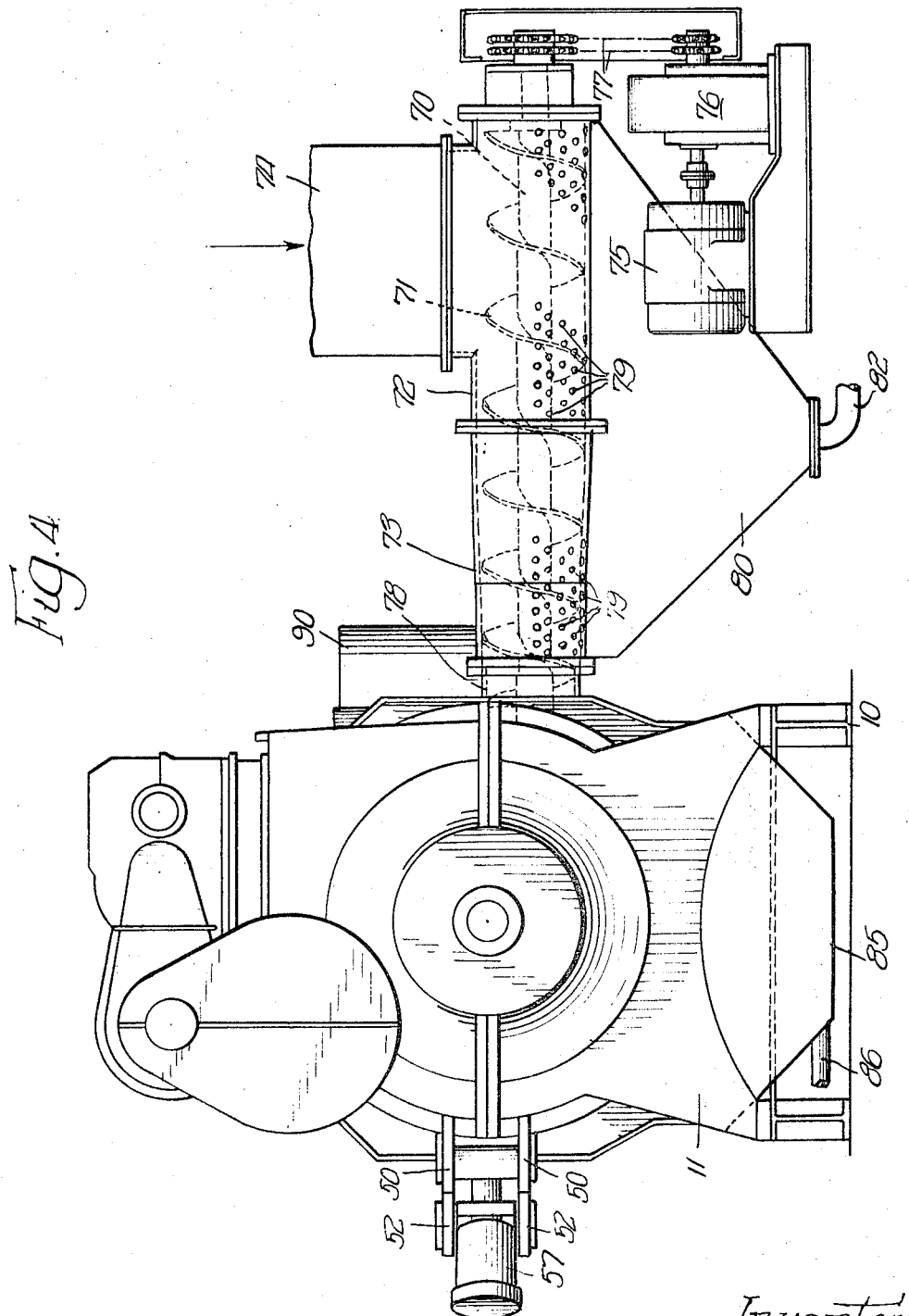

United States Patent Office 3,431,839
Patented Mar. 11, 1969

3,431,839
PRESS FOR SEPARATING LIQUIDS
FROM SOLIDS
Harold F. Silver and Frank B. Price, Denver, Colo., assignors to American Factors Associates, Limited, Honolulu, Hawaii, a corporation of Delaware
Filed Oct. 27, 1965, Ser. No. 505,333
U.S. Cl. 100—158                        6 Claims
Int. Cl. B30b 3/04

ABSTRACT OF THE DISCLOSURE

A conical press having an opposed pair of rotating conical discs. The discs are rotated by motor drives. The discs are supported on structures pivotally hinged on a vertical axis to open and close the nipline of the press. The discs are provided with a plurality of openings communicating with the working face for drainage of the extracted fluids. Reinforcing ribs are provided on the sides of the discs opposite the working face. The ribs are spaced and spirally curved in a direction opposite to the direction of rotation to provide drainage passageways for the extracted fluid to an underlying collecting chamber.

---

This invention relates to a new and improved continuous press for separating liquids from solids of the type comprising a pair of opposed cooperating conical discs which are mounted for rotation in the same direction on axes which intersect, but which are disposed at a slight angle one to the other.

Presses of this type are capable of being used for various purposes, such as for removing water or other liquids from subdivided solid materials, and are particularly useful for heavy-duty work where a substantial pressing action is required. Presses of this type are particularly adapted for pressing various materials such as bagasse, wood pulp, various forms of cellulose fibers, brewer's grain, beet pulp, and similar substances.

The press of this invention is especially adapted for use in dewatering bagasse which emerges from the diffusion process, described and claimed in copending application Ser. No. 237,575, filed Nov. 14, 1962, and entitled, "Solvent Extraction Process," which issued as Patent No. 3,248,263.

It is an object of this invention to provide a press of the type referred to which is simple in construction, but which is capable of continuous heavy-duty operation involving removal of liquids under high pressures.

It is a further object of this invention to provide a press of the type described which has two opposed cooperating rotary conical discs mounted in pivotal relationship one to the other, with the axis of the pivot disposed so as to pass through the point at which the axes of the two rotating discs intersect.

It is a further object of this invention to provide a press of the above-described type in which the axis of the pivot for connecting said two cooperating conical discs is disposed vertically, whereby the weight of the pivoted parts is sustained by the hinge bearings connecting said discs and their associated parts, respectively, and the respective parts of the press are free from any tendency to move on the hinge axis due to the influence of gravity.

It is a further object of this invention to provide a press of the above-described type which has a compression chamber provided between said opposed conical disc faces which is closed adjacent the hubs of said discs by cooperating surfaces—carried, respectively, by each of said discs —which are complementary and are formed as portions of the surfaces of spheres, having as their centers the point of intersection of the respective axes of said discs.

It is a further object of this invention to provide a press of the type referred to which, in addition to having cooperative spherical surfaces adjacent the hubs of said conical discs, has a closing wall throughout the compression portion of the press chamber which has a surface formed as a portion of the surface of a sphere, having as its center the point of intersection of the respective axes of said discs.

A further object of this invention is to provide a press of the above-described type in which one of the discs is mounted in a stationary part, and the other disc is mounted in a floating part and in which the floating part is connected to the stationary part by a hinge having a vertical axis.

It is a further object of this invention to provide a press of the above-described type which is especially adapted for pressing bagasse, and in which the conical discs may be provided with holes through which the expressed liquid may pass.

It is a further object of this invention to provide a press of the above-described type which is adapted for use with bagasse and which has a screw feeding mechanism constructed to express a portion of the liquid as it is being fed to the press.

These and other objects not specifically enumerated are contemplated for this invention as will readily appear to one skilled in the art as the following description proceeds. By way of example, this invention is illustrated in the accompanying drawings in a particular form which is especially adapted for expressing liquid such as water or sugar juice from bagasse.

In the drawings:

FIGURE 1 is a plan view, partly in cross-section, illustrating the internal construction of a portion of the press and the relationship of the conical discs when they are in operative position;

FIGURE 2 is also a plan view of the press showing the external construction, the hinge between the stationary and floating parts thereof, and the mechanism for moving the floating parts into compressive relationship with the other parts of the press;

FIGURE 3 is a side elevational view of the press illustrated in FIGURE 1 with portions removed to reveal the relationship of the stationary and floating parts and the hinged connection therebetween;

FIGURE 4 is an end elevational view of the press illustrated in FIGURE 1 further showing the feed screw mechanism which, in addition to feeding material to the press, serves to express a portion of the liquid of the material being fed;

Figure 5:
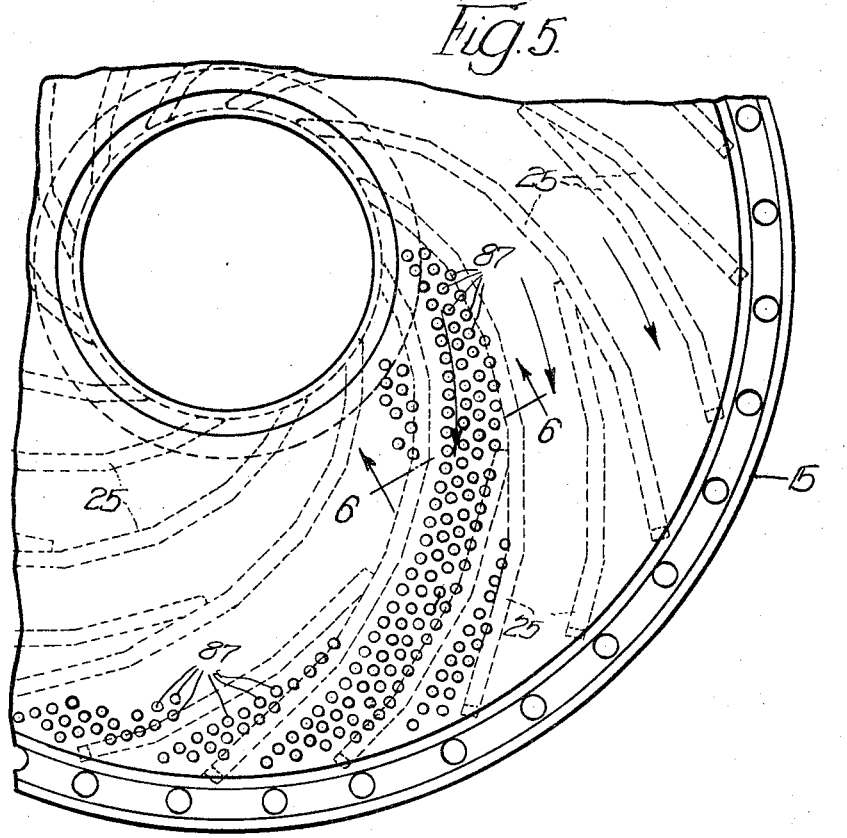
FIGURE 5 is a fragmentary elevational view showing the construction of the conical discs employed in this illustrated embodiment of the invention.

Referring to the drawings, it will be noted that the press comprises a stationary part 10 which consists of a frame 11, which also constitutes a housing for one of the rotary conical discs. A partition 12 is provided in the housing which serves as a mounting for a bearing 13 for rotatably supporting the shaft 14 for the conical disc 15. The rear end of the shaft is provided with a plate 16, which, in turn, is supported by bearing 17 mounted in the housing. The end surface of the plane 16 is provided with a race 18 for bearing-engagement with thrust bearings 19, which may be mounted in the manner shown.

The shaft 14 is provided with a spur gear 20 which is driven by a pinion (not shown) from a motor 21. Preferably the motor drives a helical gear reducer 22 which, in turn, drives a chain reduction 23 which drives the spur gear 20 through reduction gear mechanism 24 by means of the pinion referred to.

The conical disc 15 is constructed with a plurality of ribs 25 which are supported by conical plate 26 and radial supports 27, all in a manner to provide the necessary strength and rigidity to the disc. Adjacent the axis of the disc 15 is a hub member 30 which has a surface 31 formed as a portion of the surface of a sphere, having the point 32 lying on the axis of the disc 15 as its center. At the periphery of the disc 15 a flange 33 is provided, preferably bolted to the disc as shown at 34, having an inner surface 35 which is formed as a portion of the surface of a sphere, also generated around the point 32 as its center.

In addition to the stationary portion of the machine, a similarly constructed portion having an opposed conical disc 40 is provided as represented by the numeral 42. This floating portion of the press is pivotally mounted to one side of the stationary portion on hinges 44—44 located at the top and bottom of the housing 11 of the stationary portion of the machine, with its axis disposed vertically in a position to intersect the point 32 which constitutes the point of intersection of the axes, respectively, of the two discs 15 and 40 and which, as above described, also constitutes the center from which the spherical surfaces 31 and 35 are generated. The construction of disc 40, including the shaft and bearings therefor, is the same as that illustrated and described with respect to the disc 15 of the stationary portion of the machine and, hence, a further description is unnecessary. It should be understood, however, that the floating disc 40 is driven by its own motor and gearing mechanisms, which preferably are similar to those previously described, with the drive so adjusted that the discs 15 and 40 both rotate in the same direction and approximately at the same speed.

As illustrated in FIGURES 2 and 4, the frame 11 of the stationary portion of the press is provided with mounting lugs 50 which accommodate a pivot 51 to which is pivotally attached a pair of links 52. Similarly, lugs 53 are provided for the pivot pin 54 which mounts pivotally a link 55. Links 52 and 55, respectively, are pivotally connected to a pair of straps 56 which, in turn, are pivoted to a suitable power mechanism, such as a hydraulic cylinder 57, which has associated with it a power piston 58 pivotally connected as at 59 to the housing of the stationary portion of the mechanism. This or similar means are employed for drawing the pivots 51 and 54 toward each other to cause the floating portion of the mechanism to rotate in a counterclockwise direction, as illustrated in FIGURE 2, around pivots 44 to bring the discs into operative compressing relationship or, in other words, into that relationship illustrated in FIGURE 1.

As shown in FIGURE 1, the space between the disc will be at a minimum along the horizontal line constituting the radius on the right-hand side of the stationary disc as viewed from the left of FIGURE 1. At the opposite side or, in other words, at 180° removed from the line of closest approach between the two discs, the greatest space is provided and this space constitutes the location in the circumference of the device where the material to be pressed is fed into the compression chamber.

The space between the discs constituting the compression chamber, from a point somewhat above the location of the feeding inlet, is closed by a housing which extends downwardly and around the bottom portion of the compression chamber for a distance of approximately 150° or, in other words, throughout that portion of the circumference of the discs where such a wall is required to close the compression chamber. It will be noted from the illustration at the bottom of FIGURE 1 that the edge 60 of the disc 40 is provided with a surface formed as a part of a sphere, generated around the point 32 as its center, and that this edge throughout a portion of the circumference of the discs on either side of the nipline is disposed in closing relationship with the inner spherical surface 35 of the flange 33 carried at the periphery of the disc 15. However, beyond this arc of overlap, the compression chamber becomes increasingly larger in the direction of the feed inlet and, consequently, in order to close the compression chamber a wall is required to supplement the overlap provided by the disc edge 60 and flange 33. Such a closing wall is illustrated at 62 in FIGURE 1, it being understood that the inner surface thereof is formed as a part of the surface of a sphere and that it serves as a continuation of the spherical surface 35 on the inside of the flange 33 throughout its extent. The wall 62 is fixedly mounted by means (not shown) to a part of the housing 11, which encloses the stationary disc 15. By virtue of the fact that the inner surface of the wall 62 is spherical, it also cooperates with the edge 60 of the disc 40 so that the compression chamber is closed completely throughout its extent between the location of the inlet feed and the nipline between the discs.

Material, such as bagasse, which is to be treated in the press may be fed thereto by means of a feeding screw of the type illustrated in FIGURE 4. As there shown, a shaft 70 is provided for a feeding screw flight 71 which is mounted for rotation in a housing 72. A portion of the housing 73 is preferably conical in shape and the portion of the screw which occupies the conical portion of the housing is likewise conical. Adjacent one end of the screw there is a top opening to which a feed shaft 74 is attached to accommodate bagasses or similar material to be treated, which moves downwardly in association with the adjacent portion of the screw. The screw is preferably driven by a motor 75, a reducing gear 76, and drive chain 77 in a direction to advance the material fed to the screw toward the press. The end of the screw on the opposite side of the conical portion 73 is likewise cylindrical and it feeds into the feed inlet opening 78.

As shown in FIGURE 4, the feed is preferably located slightly below the horizontal line on the side of the press where the compression chamber is of the greatest dimension. The discs are geared to rotate in a clockwise direction (as viewed in FIGURE 4) so that as the material is fed radially inwardly into the widest portion of the chamber between the discs it is caused to move downwardly into the compression chamber. The compression chamber is defined by the opposed disc faces and the closing wall 62 throughout a portion of its extent, and by the opposed disc faces and the flange 33 throughout the remaining portion of its extent. The compression chamber here referred to identifies that portion of the space between the opposing discs which extends from the region of the feed inlet to the nipline between the discs or, in other words, the radial line of highest compressive action which, by virtue of the fact that the floating portion of the machine is mounted by a vertical axis, occurs at right-angles to the hinge axis or, in other words, at the horizontal radius on the side opposite to the feed inlet.

The housing surrounding the feed screw is preferably provided with holes 79 therein, at least throughout the bottom half thereof, through which expressed liquid may pass and fall downwardly into a collecting basin 80. The action of the screw throughout the conical portion thereof places the material under compressive force which serves well to eliminate a substantial portion of the liquid. The liquid in the basin 80 may be withdrawn through a suitable pipe 82 by any suitable means.

The material is fed laterally into the press, approximately at the median line with respect to the height of the machine, and passes downwardly and then upwardly until it reaches the nipline of the press. During this period, the material is placed under greatest compression and, as a consequence, the liquid is prevented from passing the nipline of the press.

Figure 6:
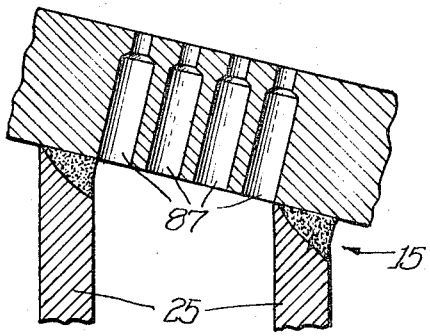
FIGURE 6 is a cross-sectional view taken on the line 6—6 of FIGURE 5.

Various means may be employed to remove the liquid such as, for instance, having it back up and flow out of an opening or openings suitably placed in the compression chamber or, preferably, particularly when treating bagasse, by having the discs provided with holes 87, as clearly illustrated in FIGURES 5 and 6. The liquid passing through the holes is caused to fall downwardly into the liquid collecting chamber 85, as clearly shown in FIGURE 4. The collecting chamber is so mounted with respect to both discs that the liquid flowing through the openings on both discs finds its way by gravity into the collecting chamber. Liquid may be removed from the collecting chamber 85 by a pipe 86, through the use of a pump or any other suitable means.

The solid material that passes beyond the nipline of the press is ready for discharge from the press, as all of the pressing action that can be exerted thereon has been completed. Consequently, it passes upwardly and to the top of the machine where the two faces of the opposed discs are diverging and where the faces, respectively, encounter scrapers which effectively remove the spent material therefrom. The material thus removed is forced outwardly of the press through a discharge chute 90, which is illustrated in FIGURES 2 and 4. The scrapers are not shown, but it is to be understood that a separate scraper is provided for each disc and that the housing for each disc, at the upper part thereof, provides a support for the scraper which is attached thereto by suitable means.

An important feature of this invention is illustrated in FIGURE 1 from which it will be noted that the stationary and floating portions of the press, each with its rotating disc, are so constructed and disposed that the focal point of the thrust force of each of the thrust bearings is located on a straight line which passes through the point on the nipline of the press which represents the center of gravity of the material being compressed at that line. As shown in FIGURE 1, point A represents the focal point of the thrust bearing for the stationary portion of the machine and point B represents the corresponding focal point for the thrust bearing for the floating portion of the machine and, when disposed in operative position as illustrated, the straight line C—which passes through points A and B— passes through point D which is located substantially on the point of the center of gravity of the material being treated at the nipline of the press. This feature of the construction takes maximum advantage of the thrust bearings for absorbing the thrust load and, accordingly, places a minimum load on the radial bearings employed for the disc shafts, respectively.

Although the conical discs as illustrated in FIGURE 1 do not show holes extending through the faces of the discs, it is to be understood that one form of the invention may employ discs of the construction illustrated in FIGURES 5 and 6 which illustrate such holes. The disc illustrated in FIGURE 5 is constructed to be mounted to rotate in a counterclockwise direction so that the liquid, when forced through the holes 87, can fall by gravity in a downward direction as illustrated by the arrows within the spaces existing between the ribs 25. Due to the fact that both the long and the short ribs are mounted on a generally spiral path, the spaces between adjacent ribs are open in the downward direction throughout that portion of the circumference of the conical discs, respectively, where the pressing action is accomplished. This feature and the fact that the openings 87 are smaller adjacent the surface of the disc than they are below the surface prevent clogging of the holes of the disc and provide a free passage for the liquid downwardly in its movement to the collecting chamber 85 located below the press.

The form of this invention herein disclosed is illustrative and is given only by way of example. The scope of the invention is not to be limited thereby as it is intended that the appended claims be construed as broadly as may be permitted by the prior art.

We claim:

1. A press of the character described comprising a pair of opposed cooperating conical discs mounted for rotation in the same direction on axes which intersect, means for mounting one of said conical discs and means for mounting the other of said conical discs, said two mounting means being disposed so that a predetermined space is provided between portions of said conical discs for the passage of material therebetween for pressing the same, means, including portions of said conical discs, having cooperating surfaces for closing the compression chamber of said press, which surfaces are generated as portions of the surfaces of spheres, respectively, having the point of intersection of the axes of said conical discs as their center, said conical discs provided with openings in the opposed surfaces thereof for the passage of liquid, means for collecting said liquid, and supporting and strengthening ribs provided for the face plate of said conical discs, said supporting and strengthening ribs being disposed in a generally spiral relationship extending from the hub to the circumference of said discs in a direction, relative to their rotation, so that unobstructed open channels are provided therebetween for the gravitational passage of liquid therethrough in a downward direction from the location inwardly of the periphery of said discs toward the periphery thereof.

2. In a press of the character described, the combination comprising, a pair of opposed cooperating discs of generally frusto-conical shape mounted for rotation in the same direction on axes which intersect, means for rotatably mounting one of said discs, means for rotatably mounting the other of said discs, said two mounting means being disposed so that a predetermined space having a nipline is provided between portions of said discs for the passage of material therebetween for pressing the same, means including portions of said discs having cooperating surfaces for closing the compression chamber of said press, motor means for rotating each of said discs in the same direction, means for feeding material to said discs, means for removing material from said discs, said discs provided with openings in the opposed surfaces thereof for the passage of liquid therethrough, means for collecting said liquid passing through said openings, and supporting and strengthening ribs opposite the working face of said discs and extending generally radially of said discs, said supporting and strengthening ribs being curved in a direction opposite from the direction of rotation of said discs, so that unobstructed open channels are provided therebetween for the gravitational passage of liquid therethrough in a downward direction toward the periphery of said discs.

3. In the press of the construction described in claim 2, in which said strengthening and supporting ribs are curved sufficiently for a plurality of ribs to traverse a radial line.

4. In the press of the construction described in claim 2 in which said discs are mounted to provide a substantially non-vertical nipline.

5. In a press of the construction described in claim 2 in which said discs are mounted to provide a substantially horizontal nipline.

6. In a press of the construction described in claim 2 in which said openings in said discs are relieved on the side opposite the working face of said discs.

References Cited

UNITED STATES PATENTS

| 271,161 | 1/1883 | Treber | 100—158 |
| 2,617,354 | 11/1952 | Ingalls | 100—158 X |
| 2,789,618 | 4/1957 | Bennett | 100—158 |
| 3,105,434 | 10/1963 | Messing | 100—158 |
| 3,111,082 | 11/1963 | Larsson et al. | 100—117 X |

FOREIGN PATENTS

| 430,376 | 6/1935 | Great Britain. |
| 32,830 | 5/1934 | Netherlands. |

LOUIS O. MAASSEL, *Primary Examiner.*